R. OCKEL.
COOLER FOR EXTRACTION APPARATUS AND THE LIKE.
APPLICATION FILED APR. 1, 1913.
1,095,165.
Patented Apr. 28, 1914.
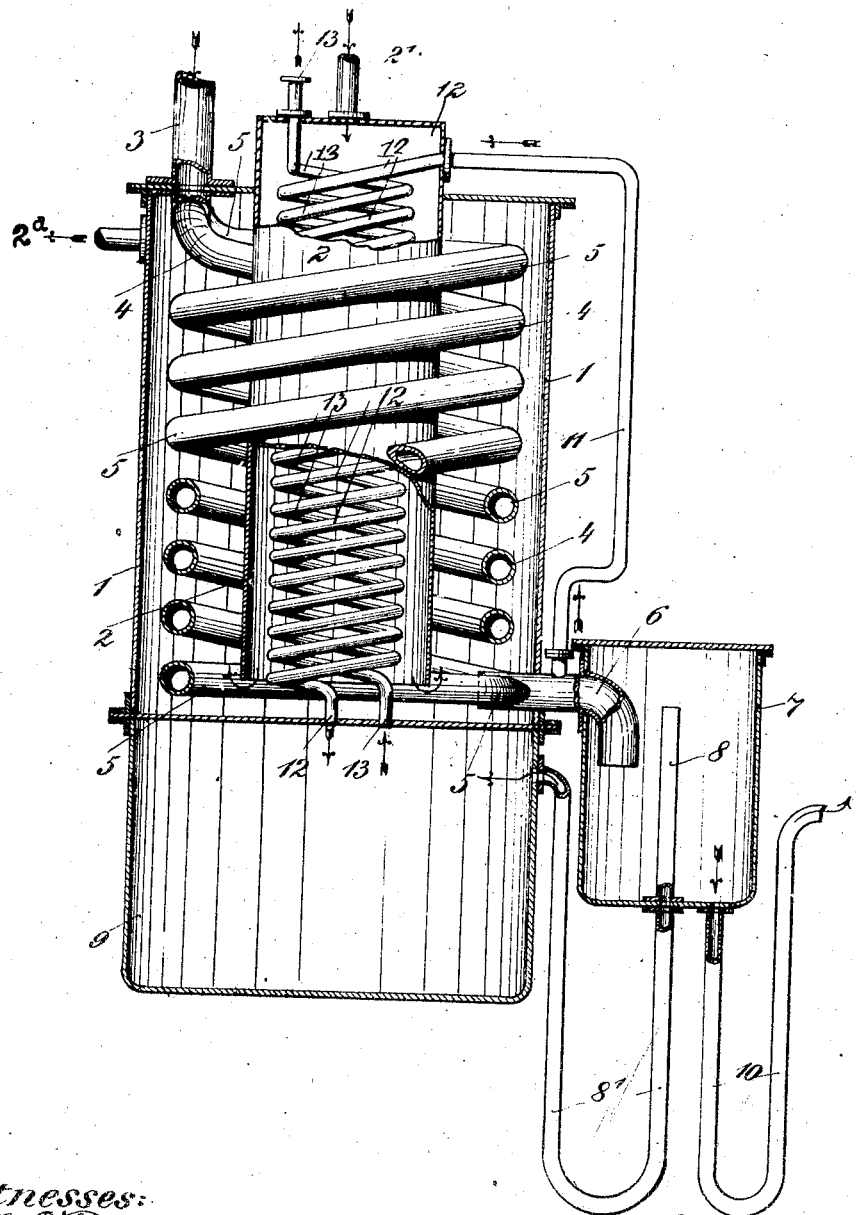
Witnesses:
Georg Otto
Berthold Aulke
Inventor:
Reinhold Ockel

UNITED STATES PATENT OFFICE.

REINHOLD OCKEL, OF BONN, GERMANY.

COOLER FOR EXTRACTION APPARATUS AND THE LIKE.

1,095,165.

Specification of Letters Patent. Patented Apr. 28, 1914.

Application filed April 1, 1913. Serial No. 758,264.

*To all whom it may concern:*

Be it known that I, REINHOLD OCKEL, a subject of the German Emperor, and resident of Schumannstrasse, 31, Bonn-on-the-Rhine, Germany, have invented certain new and useful Improvements in Coolers for Extraction Apparatus and the like, of which the following is a specification.

The present invention relates to a cooler for extraction apparatus and the like.

The coolers, which have hitherto been employed for condensing vapors, for instance pipe coils, consist generally of comparatively narrow pipes, which have the same section throughout their entire length. The narrow pipes have the advantage, that the condensation is a better one than if wider pipes were used, which will always allow of a great part of the gases passing through without being condensed. The narrow pipes on the other hand have the great disadvantage, that they will easily cause a back pressure, as the last coils of the pipe system are generally filled to a considerable extent with the condensate. Furthermore the great frictional resistance in a cooler coil made of narrow pipes must be considered.

The present invention relates to a cooler, which is composed of different pipes, partly of a wide and partly of a narrow section. Wide pipes are preferably employed up to the point, where the principal portion of the condensate can flow off, (in extraction apparatus the water separator), and thereafter narrow pipes are employed. By such means it is possible to obtain a capacity, which is by four to five times as great as that of a plant of the kind hitherto employed, that is with pipes of a constant narrow section. The reason for this lies, obviously, in the fact, that on the one hand the condensate will offer a much larger surface in the wide pipes and will thus act as an effective wet condenser for the not yet condensed vapors and on the other hand the vapors can flow much faster through the long pipes and thus also reach the lower pipes quicker, which are surrounded by colder water.

In the accompanying drawing a constructional form of the present invention is exemplified.

1 is a water tank having a wall or cylinder 2 arranged within it. This cylinder 2 is open below and does not fully reach the bottom of the tank 1, so that the cooling water entering through pipe $2^1$ can pass from the cylinder 2 into the tank 1 and out through the outlet pipe $2^a$. The vapors, which are to be condensed and will enter through a pipe 3 of a comparatively large diameter, say 8 inches, flow through two parallel pipe coils 4 and 5 of a somewhat smaller diameter, say 6 inches, which are connected to the pipe 3 and which shortly before they leave the tank 1 are joined into one pipe 6. From the latter the whole condensate flows into the trap 7, from which the less heavy liquids such as benzene will flow through the high standing pipe 8 and the thereto attached bend $8^1$ into the tank 9, while the water will pass off through the pipe 10 at the bottom of the trap 7. The benzene vapors which have not been condensed will rise through a pipe 11 branched off from the pipe 6 immediately in front of the trap 7, and are condensed in the pipe coil 12 of a small diameter, say about 2 inches, communicating with the pipe 11. From the said pipe coil 12 the condensate passes into the tank 9, where the benzene will remain, while the uncondensed gases and the air (from the charge and the boiler feed water) pass out into the atmosphere through the pipe coil 13 of also about 2 inches diameter rising from the tank 9. Any benzene which is still condensed in this pipe will flow back into the tank 9.

I claim:

1. The combination with a casing; of a cylinder mounted within said casing and having an open bottom, the bottom of the casing being spaced below the bottom of said cylinder, a condensing coil surrounding the cylinder within the casing, a second condensing coil within the cylinder and having its upper end connected by a pipe to the lower end of the first mentioned coil, the lower end of the last mentioned coil extending through said casing and forming a delivery, an inlet pipe communicating with said cylinder, and an outlet pipe leading from said casing at a point adjacent the top.

2. The combination with a casing provided with a bottom; of a closed tank located beneath said bottom, a cylinder mounted within said casing and having an open bottom communicating with the interior of the casing, an inlet pipe communicating with the top of the cylinder, an outlet pipe leading from the casing near the top thereof, a condensing coil surrounding said cylinder within the casing, an inlet pipe communicating with one end of the condensing coil, an outlet pipe leading from the lower end of the condensing coil, a second condensing coil arranged within the cylinder, a pipe connecting the upper end of the second condensing coil with the last mentioned outlet pipe, the lower end of the second condensing coil extending into the closed tank, a separator connected to the last mentioned outlet pipe, a pipe leading from said separator to said tank, and a waste pipe leading from the separator.

3. The combination with a casing provided with a bottom; of a closed tank located beneath said bottom, a cylinder mounted within said casing and having an open bottom communicating with the interior of the casing, an inlet pipe communicating with the top of the cylinder, an outlet pipe leading from the casing near the top thereof, a condensing coil surrounding said cylinder within the casing, an inlet pipe communicating with one end of the condensing coil, an outlet pipe leading from the lower end of the condensing coil, a second condensing coil arranged within the cylinder, a pipe connecting the upper end of the second condensing coil with the last mentioned outlet pipe, the lower end of the second condensing coil extending into the closed tank, a separator connected to the last mentioned outlet pipe, a pipe leading from said separator to said tank, a waste pipe leading from the separator, a third condensing coil arranged within said cylinder and having its lower end communicating with the tank and its upper end extending from the cylinder.

In testimony whereof I have hereunto signed my name this 19th day of March 1913, in the presence of two subscribing witnesses.

REINHOLD OCKEL.

Witnesses:
LOUIS VANDORY,
BESSIE F. DUNLAP.